Figure 3:
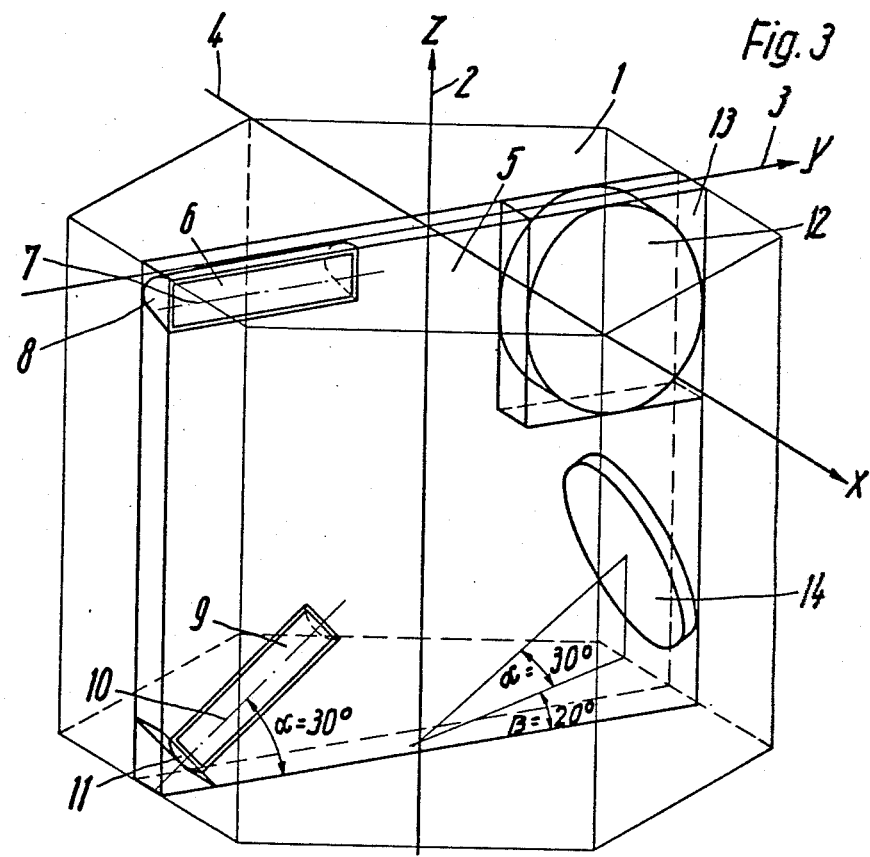

United States Patent
Calderara et al.

[11] 4,016,437
[45] Apr. 5, 1977

[54] PIEZOELECTRIC PRESSURE AND FORCE TRANSDUCERS OR ACCELEROMETERS

[75] Inventors: Reto Calderara, Bern; Hans U. Baumgartner, Winterthur; Jan Tichý, St. Gallen; Hans C. Sonderegger, Neftenbach, all of Switzerland

[73] Assignee: Kistler Instrumente AG, Switzerland

[22] Filed: Jan. 28, 1976

[21] Appl. No.: 653,154

Related U.S. Application Data

[63] Continuation of Ser. No. 234,948, March 15, 1972.

[30] Foreign Application Priority Data

Mar. 15, 1971 Switzerland .................... 3758/71

[52] U.S. Cl. .................... 310/8.7; 310/9.5
[51] Int. Cl.² .................... H01L 41/04
[58] Field of Search ............ 310/8, 8.3, 8.7, 9.1, 310/9.4, 9.5, 9.6

[56] References Cited
UNITED STATES PATENTS

| | | | |
|---|---|---|---|
| 2,216,966 | 10/1940 | Swift | 310/8.7 |
| 2,507,636 | 5/1950 | Kistler | 310/8.7 |
| 2,703,848 | 3/1955 | Kistler | 310/8.7 |
| 3,230,402 | 1/1966 | Nightingale et al. | 310/8.7 X |
| 3,349,259 | 10/1967 | Kistler | 310/8.7 |

Primary Examiner—Mark O. Budd
Attorney, Agent, or Firm—Craig & Antonelli

[57] ABSTRACT

A piezoelectric transducer element which can be used in force and pressure transducers is made from a quartz element which is prestressed within the transducers. The prestress is applied within a certain orientation with respect to the lattice plane (0 4 $\bar{4}$ 3). The transducer may include both disc and rod-shaped quartz elements.

13 Claims, 4 Drawing Figures

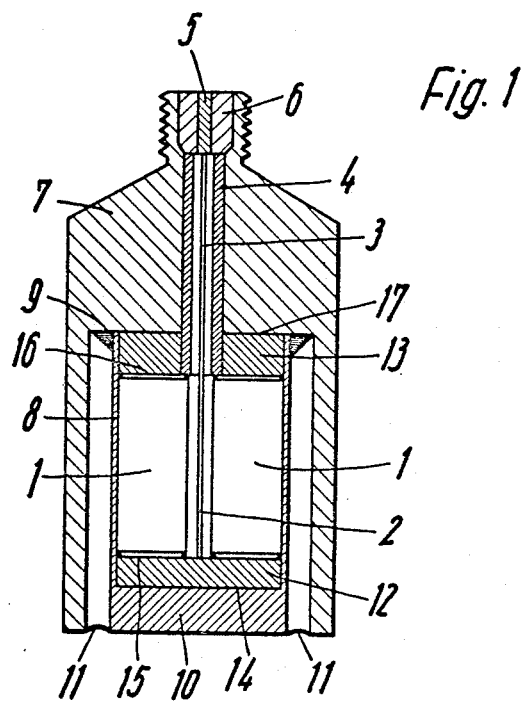
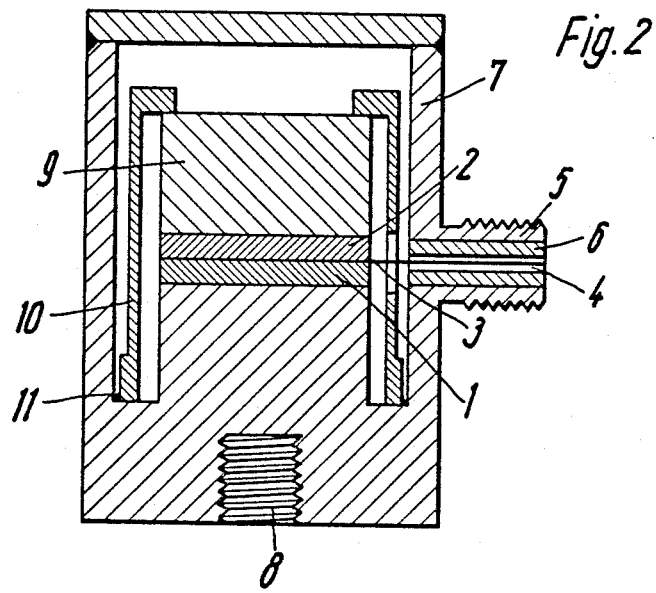

PIEZOELECTRIC PRESSURE AND FORCE TRANSDUCERS OR ACCELEROMETERS

This is a continuation application of U.S. application Ser. No. 234,948, filed Mar. 15, 1972.

The present invention relates to piezoelectric pressure and force transducers and accelerometers and to the manner of orienting and arranging the crystal elements therein.

Since the discovery of the piezoelectric effect by the Curie brothers, many types of mechanical-electrical measuring transducers based on this effect have been produced, in particular force and pressure transducers and accelerometers. The construction of a piezoelectric force transducer obviously suggests itself, since the piezoelectric crystal responds directly to forces. But pressure transducers and accelerometers have also been developed with many variants; in these, the pressure or acceleration to be measured is converted into a force which acts on the piezoelectric element. Automotive engineers, in particular, employ piezoelectric pressure transducers on a considerable scale. The compactness, high rigidity and high resonant frequency of these instruments makes them eminently suited for measuring the combustion pressures in engine cylinders as well as the injection pressures in the injection lines of diesel engines. Piezoelectric transducers are distinguished by the fact that they are active transducers, in other words the mechanical variable is measured directly as an electrical variable. In the piezoelectric transducer this variable is an electrical charge. By contrast, in the case of the passive transducers an electrical variable, such as a current supplied from a special source, is led through a strain gauge. Making use of the piezoelectric effect simplified the basic conception of a measuring system, though despite its simplicity and the few basic components needed for the measuring procedure, the system may become very complex if it is to satisfy all the secondary requirements of practical operation. Yet, when compared with other measuring systems piezoelectric ones feature considerable advantages.

Furthermore, since the discovery of the piezoelectric effect, quartz has often been used as a piezoelectric material. Although many other piezoelectric crystals and ceramics are known, possessing a piezoelectric effect orders of magnitude greater than that of quartz this material still enjoys widespread use in piezoelectric transducers on account of the good linearity of its piezoelectric effect, its very good linear elastic properties, its high strength, its relative abundance in nature and the ease in growing quartz crystals.

There has long been a demand for measuring sensors capable of functioning in a high temperature environment, for indicating the combustion pressures in diesel and Otto engines, and this has led to major difficulties. The quartz crystals have to withstand temperatures of 300° C and more yet still function accurately. More recently, piezoelectric quartz transducers have been employed in rockets, shock tubes, plastics extruders, internal ballistics investigations, dust explosion investigations, pressure monitoring in the combustion chambers of gas turbines etc., wherever there exists this same requirement that the pressure sensor must function satisfactorily at elevated temperatures.

Experience has revealed that there is a reduction in the calibration factor of the transducer when quartz is heated over a long period, and that this effect is still present when the transducer is calibrated again at room temperature. This irreversible reduction of the piezoelectric effect may be so pronounced that the pressure transducer loses its sensitivity completely, so that it can no longer function, or the polarity of the charge produced may even be reversed. This problem arises from the formation of Dauphiné twin areas. In quartz, three main types of twin formations are known: the Brazilian, Japanese and Dauphiné twins. The first two of those occur only as morphological variants of crystal growth and may be ignored, but the third type of twins is of great importance since, under the influence of certain stress states and high temperatures, an entire quartz crystal or certain parts of it may undergo the twin modification. Quartz belongs to the trigonal-trapezohedral crystal class $D_3$-32 and occurs in two enantiomorphous forms known as left-handed and right-handed quartz respectively. Although the present explanation is directed to right-handed quartz, it applies analogously to left-handed quartz, provided that a left-handed coordinate system is associated with left-handed quartz. In right-handed quartz the Z axis is selected to be parallel to the crystallographic $c$ axis, and the X axis parallel to a crystallographic $a$ axis. At the positive end of the X axis a negative electrical charge is set up under pressure in the direction of the X axis. The Y axis is at right angles to the X and Z axes and forms a right-hand coordinate system in right-handed quartz. It should be emphasized that the Z axis is an axis of triple symmetry, so that in a quartz crystal there are always three equivalent X and Y axes. The designations of the crystal selections mentioned hereafter refer to such a coordinate system. The designation of the crystallographic orientation of a crystal element (rod or disc) conforms to the recommendations of the IRE [Proc. IRE Vol. 37, 1378 (1949)] and comprises an indication of any starting position in which the edges of the crystal section lie parallel to the X, Y and Z axes, and an indication of any turns which enable the crystal section to be brought from the selected starting position into its location. In such a designation the first letter denotes the direction of the thickness $t$ of the crystal element (the direction of the normal to its greatest surfaces), and the second letter the direction of its length $l$ in the selected starting position. The further letters and the angles added denote the edges of the crystal element on which this is turned by the angles stated. The width of the crystal element is denoted by $w$.

The X and Y axes of the twinned material have an orientation rotated 180° about the Z axis in relation to the original material. A piezoelectric quartz disc cut perpendicularly to the X axis, for example, reverses its piezoelectric effect if the material undergoes twinning as a result of high external forces and high temperatures. Experience has shown that an entire disc undergoes the twinning modification only rarely; as a rule there are only individual areas delimited from the remaining untwinned material by axially parallel planes. The twinned areas can be made clearly visible under obliquely incident light after etching with hydrofluoric acid. Dauphiné twin formations are not visible in polarized light, however. When subjected to pressure a piezoelectric disc with such twin areas generates inverse charges in these areas, which are cancelled out by the other-correct-charges, so that the result is an attenuation of the piezoelectric effect. If more than half of the original material has undergone twinning, the polarity of the piezoelectric effect will even be reversed.

In known pressure transducers, operation at high temperatures has been made possible by the provision of cooling arrangements principally using air or water, to keep the temperature of the crystal below an acceptable level — usually below 200° C. These designs suffer from the following disadvantages:

1. The water supply and its outflow together with the internal water flow inside the transducer, make this mechanically much more complicated, more expensive, bulkier and heavier.

2. The water supply and its outflow additionally complicate the installation, entailing considerable outlay, in particular, at remote measuring locations and on vehicles, where the supply cannot be easily taken from a water main.

3. When performing tests at high temperatures, cooling repeatedly fails due to undetected faults in the cooling water lines, errors or forgetfulness. This results in destruction of the expensive transducer.

Actually, the piezoelectric effect yields a good linear relation between the piezoelectric charge delivered and the force applied, unless extremely high forces are imposed. However, gas pressure, for example, cannot be permitted to act directly on quartz. Mechanical and electrical accessories are always needed to assemble a measuring transducer using quartz elements that is serviceable in practice. These accessories must be protected against environmental influences and are, therefore, always housed in a protective sleeve, so that the forces to be measured act indirectly through parts of this sleeve onto the quartz elements. If often happens that the good linear properties of quartz are nullified by non-linear intermediate members, such as the gap elasticity between the quartz and its underlay in the protective sleeve. In order to eliminate the deleterious influence of these gap elasticities, nearly all piezoelectric transducers are designed so that the piezoelectric elements are fitted with a considerable mechanical preload.

The invention, which is the subject of this patent application, is based on the adoption of new sectioning directions for the piezoelectric quartz elements, which, in conjunction with the necessary preload, assures enhanced stability against the formation of Dauphiné twins, so that the piezoelectric measurement is made possible under an ambient temperatures of at least 400° C without any need for cooling.

The invention is explained below with reference to the accompanying drawings, which also indicate the state of the art.

FIG. 1 shows a conventional piezoelectric pressure transducer. Its design is defined in Swiss Pat. No. 340,356, for example. It is a measuring transducer working with the transverse piezoelectric effect, and most of its design features can be incorporated in a new high-temperature-resistant pressure transducer in accordance with the present invention.

FIG. 2 shows an accelerometer as an example of a transducer working with the longitudinal piezoelectric effect. With this design the novel feature of the invention can also be used without altering most of the features of the conventional design.

FIG. 3 shows a piece of quartz crystal with axial orientation. It shows: a transverse piezoelectric transducer element 6 with the same orientation as that used for known pressure transducers known hitherto; a transverse transducer element with the new orientation in accordance with the invention; a disc-shaped longitudinal transducer element 12 with the conventional orientation; and a longitudinal transducer 14 with the new orientation according to the invention.

Figure 4:
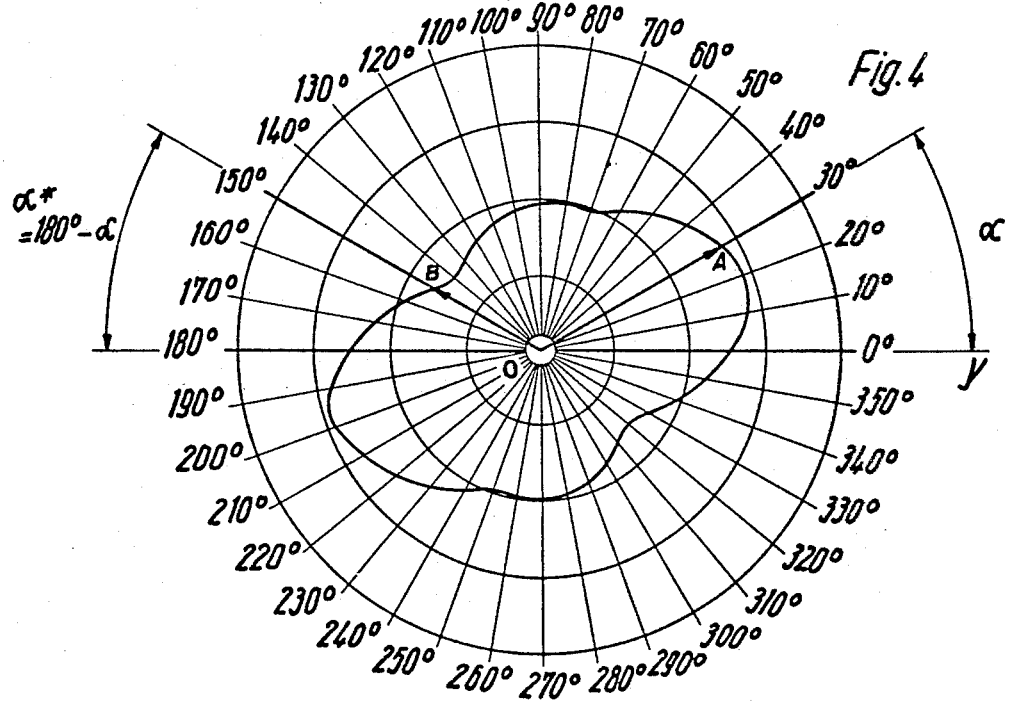

FIG. 4 is a polar diagram in the YZ plane for the coefficients of elasticity.

The conventional pressure transducer, as shown in FIG. 1, contains as its most essential element two semi-cylindrical piezo quartzes 1 with the orientation XY, each with a plane inner section surface and a cylindrical outer surface which are usually metallized. The metallized surfaces are insulated from each other electrically by facets, and serve to pick up the piezoelectrically generated charges. Clamped between the two quartz half-cylinders is a metallic electrode 2, which is connected electrically with the two metallized plane section surfaces of the half cylinders. This electrode conducts the piezoelectrically generated charges, which are usually negative in the case of pressure, through a wire 3 inside an insulating tube 4 to a plug core 5 located in an insulator 6. A highly insulated cable may be screwed onto the housing 7 with an end plug, so that the inside conductor makes contact with the plug core 5 of the pressure transducer. The quartz half-cylinders are located in a preloading sleeve 8 which is fixed to the housing with an annular weld seam 9. The pressure medium acts on the end face 10 of the preloading sleeve 8 so that the delicate thin-walled part of the sleeve and the quartzes inside it do not come into contact with the pressure medium. A diaphragm 11 is welded between the housing 7 and the end face 10 of the preloading sleeve. The end faces of the quartz half-cylinders are braced by the underlays 12 and 13 which often serve the additional purpose of protecting the quartzes against temperature influences from the end face 10 of the preloading sleeve and compensating differential thermal expansion between the quartzes 1 and the preloading sleeve 8. The preloading sleeve 8 is dimensioned to be too short, and must be stressed elastically before it can be welded to the housing 7. Consequently, after being welded secure with the seam 9 the sleeve 8 is under a tensile preload, while the underlays 12 and 13 and the quartzes 1 are under a compressive preload. The preload is needed to obtain good contacts with minimum gap elasticity at interface 14 between the end face of the preloading sleeve and the underlay 12, and also at 15, 16 and 17. The pressure forces act on the preloading sleeve at 10 and on the diaphragm at 11, and are transmitted thereby principally to the quartzes 1, where they induce an increase in the preload in the longitudinal direction of the quartz half-cylinders. These changes in the mechanical preload result in an alteration of the piezoelectric polarization perpendicular to the plane section surface, in other words, a change in the piezoelectric charges at the metallized surfaces, whereby most of the positive piezoelectric charges arising on the curvature of the quartz half-cylinders are led to the grounded housing by the preloading sleeve, with which they are in electrical contact. The piezoelectric polarization and the elastic stress, which can be characterized by homogeneous vector and tensor fields, are at right angles to each other, Hence, one speaks of the transverse piezoelectric effect. In place of the semi-cylindrical crystals other suitable geometrical forms may be adopted, such as segments, prisms, triangular elements, etc.

In contrast the accelerometer designed in accordance with FIG. 2 makes use of the longitudinal effect. This transducer functions on a quite similar principle and is likewise assembled from similar components. The quartz elements 1 and 2, which in this variant are circular discs with X orientation, generate charges when subjected to a force acting perpendicularly to the plane of the discs. These charges are conducted by the electrode 3 to the core 4 of the connecting plug 5. Between the core and the plug housing is an insulator 6. The plug is welded to the housing 7, which is provided with a threaded hole 8 for fixing the accelerometer. The positive charges are led off through the housing 7 and the seismic mass 9 directly. The preloading sleeve 10 is again welded to the housing 7 at 11 under preload, and imposes a compressive preload on the quartz discs 1 and 2. Under the influence of accelerations the seismic mass 9 sets up inertia forces which cause an alteration of the preloads, resulting in a change of the piezoelectric polarization and charges. Here the principal stress and the piezoelectric polarization vector field are parallel with each other. Hence, one speaks of the longitudinal piezoelectric effect in this case.

Depicted in FIG. 3 is a prismatic portion of the quartz crystal 1. In the axial direction of the prism, parallel to the edges, is the Z axis 2. The plane perpendicular to this Z axis cuts a hexagon out of the prismatic portion. The three diagonals of the hexagon are the X axes, and the three normals to the sides of the hexagon are the Y axes. On the crystal form illustrated the symmetry is not sixfold but threefold. A rotation of 120° about the Z axis is needed to equate the X or Y axes, resp. because the X axes have a polarity (i.e. a positive and negative sense of direction) which must not be reversed, as would be the case with only 60° rotation. The polarity is detectable from the piezoelectric effect. For the sake of simplicity, only one X axis 4 and one Y axis 3 are shown in FIG. 3.

The differences between the previously known sections for piezoelectric quartz transducers and the invention will be explained with reference to FIG. 3. As a basis for the sections to be discussed, a disc 5 cut out of this prism may be visualized, with its plane at right angles to the X axis and its sides parallel with the Y and Z axes. In crystallography, it is usual to characterize the orientation of a plane with the familiar Miller-Bravais indices. The YZ plane of disc 5 has the indices (2 $\bar{1}$ $\bar{1}$ 0).

From such a disc it is possible to cut out a desired section, or to refer it to this plane of the disc. In FIG. 3 this disc is shown in perspective with sections drawn in. The transverse half cylinders with the XY orientation (6 in FIG. 3) have the cylinder axis 7 parallel with the Y axis, and the section plane dividing the cylinder into two halves is parallel with the YZ plane (2 $\bar{1}$ $\bar{1}$ 0). The force introduction surfaces 8 are parallel to an XZ plane, i.e. to a side face of the hexagonal prism (0 1 $\bar{1}$ 0). In practice, out of the disc 5 a rectangular rod is initially cut, cemented onto a bar with the surface that is to form the cylinder section plane, and then ground into a half-cylinder. Finally, the section plane and the curvature of the half-cylinder are metallized and all edges are facetted, so that the curvature electrode and section plane electrode are insulated electrically from each other.

The transverse quartz 9 with the orientation XY $t$ 30° for the heat-resistant pressure sensor in accordance with the invention, has the same shape as the half-cylinder 6 and can be cut out of the same basic disc 5 using the same manufacturing technique. In this case the cylindrical axis 10 must likewise lie in the YZ plane, but it must be rotated 30° about the X axis in the positive direction. The force introduction surfaces 11 are then no longer parallel to a side face of the prism (0 1 $\bar{1}$ 0) but are inclined with respect thereto by 30° and correspond approximately to the lattice plane (0 4 $\bar{4}$ 3).

Conventional longitudinal quartz discs 12 may also be cut from a basis disc 5, by first cutting out a square piece 13, for example, and then mounting it and grinding a circular disc 12 from it. The electrodes are arranged on the top and bottom faces (2 $\bar{1}$ $\bar{1}$ 0) at right angles to the X axis. These constitute the force introduction surfaces at the same time. The longitudinal quartz discs for the new kind of heat-resistant transducers, with the orientation designated with the IRE symbol YZ$l$20°$w$ 30° have the same shape as the conventional discs 12, but their normal has the direction of the Y axis in the starting position and the whole disc is then rotated 20° about the Z axis, and subsequently another 30° about the X' axis rotated therewith.

Accordingly, the new orientations of the half cylinders 9 and the discs 14 are defined, compared with conventional half-cylinders 5 and the discs 12. Why the new orientations are superior with respect to heat resistant is best illustrated with reference to FIG. 4.

The elastic behavior of crystals is known to be anisotropic, i.e. dependent on direction. This dependence of the elastic compliance coefficient $s'_{22}$ on direction is represented in the form of a polar diagram in FIG. 4, for various directions in the YZ plane. For any direction forming an angle $\alpha$ with the Y axis and lying in the YZ plane, the polar curve gives the magnitude of the elasticity coefficient $s'_{22}$ as the length of the radius vector of the intersection of the straight line with the angle $\alpha$ and the plotted curve. The important features of this curve is that it is not mirror-symmetrical in relation to the Z axis. In a quartz disc or rod the directions of stress action are predetermined by the geometrical shape and arrangement. If the material is now transformed into the Dauphiné twin formation, as already stated, this means a rotation of 180° about the Z axis, so that the positive X and Y axis directions change into the corresponding negative X and Y axis directions. Thus although the direction of the stress remains the same, in relation to the new crystallographic axes of the material the strain caused by the stress, will no longer have the same direction.

Still with reference FIG. 4, if the angle $\alpha$ is determined from the positive Y axis in the positive direction and the distance OA is taken as the measure for the elastic compliance coefficient $s'_{22}$, for the material of the same crystal rod but in the Dauphiné twin form the angle $\alpha$ should be determined from −Y and not from +Y, and in the negative direction also, since the +Y axis has become the −Y axis. In this way, we arrive at a smaller value $s_{22}*'$ for the coefficient of elasticity, corresponding to the distance OB. A large coefficient of elasticity means high deformation per stress unit, in other words, it is proportional to the "softness" of the material.

The change from the greater elasticity coefficient $s'_{22}$ corresponding to the distance OA to the smaller $s_{22}*'$ corresponding to OB implies a stiffening of the material, whereas from OB to OA conversely implies softening. Now if there is a elastic preload, as is usual in piezoelectric transducers (FIGS. 1 and 2), any "stiffening" is associated with an increase in the elastic preload and at the same time with a reduction in the deformation of the crystal element. The higher elastic energy needed to increase the preload, i.e. the work that must be performed by the crystal against the external force of the preloading sleeve, must come from somewhere. Making use of the internal (heat) energy for this is ruled out, because this would violate the second law of thermodynamics. On the other hand, the quartz crystal, which was originally preloaded only in the stiffer direction OB, frees mechanical energy with the transformation from the original form to the Dauphiné twin, since the crystal becomes "softer" and this mechanical energy is converted into heat. This second process of the Dauphiné twinning is irreversible, because as mentioned above the free heat can no longer be converted into elastic energy. Owing to the mechanical preload one Dauphiné twin form is stabilized and the other destabilized. Thus, given the slightest inducement, the latter will tend to transform into the stable form by spontaneous twinning. Under preload, the greater the difference between the elastic energies of the two forms, the stabler one form of the Dauphiné twins against the other. This difference is governed in the first place by the amount of preloading, varying as the square of the preload, and secondly by the angle $\alpha$. If $\alpha = 0°$, as would correspond to the old orientation of the quartz rods, there is no difference at all. The same is true for $\alpha = 90°$. The maximum different of the elasticity coefficients for $\alpha$ and $\alpha^* = 180° - \alpha$, and hence for the elastic energy under the given preload is found with an angle $\alpha = 30°$.

However, in principle any angle $0 < \alpha < 90°$ (or $180° < \alpha < 270°$ as the case may be) is better than the old orientation with $\alpha = 0°$. It is however, advantageous to adopt $\alpha = 30°$ for transverse quartzes, as shown in FIG. 3. Certain difficulties are encountered with longitudinal quartzes. In order to achieve optimum stability with regard to twinning, with longitudinal quartzes also the force ought to act in this direction at $\alpha = 30°$ to the Y axis lying in the YZ plane. The disc plane of the longitudinal quartzes serving to introduce the force and mount the electrodes would then be perpendicular to the YZ plane. Yet, for all such planes in quartz the longitudinal piezoelectric effect is $= 0$. The projection of the normal to the disc plane of longitudinal quartzes onto the XY plane must be rotated from the YZ plane by an angle $\beta$ if any longitudinal piezoelectric effect is to be detectable at all. This longitudinal piezoelectric effect would be greatest with the angle assuming an odd multiple of 30°. Then, however, the energy difference between the two Dauphiné twins would disappear, and both twin forms would be equally stable. Thus, a compromise must be sought between the greatest possible stability and maximum piezoelectric effect. This is obtained with an approximate angle $\beta = 20°$ or so, at which about 50% of the energy difference of the two twin states is secured which would exist under the same preload with an angle $\beta = 0°$, while on the other hand, some 60% of the piezoelectric effect with $\beta = 30°$ results.

The orientation of the force introduction surfaces on such a transducer corresponds approximately to the quartz lattice plane ($\bar{1}$ 3 $\bar{2}$ 2). If more than one state is possible for a system, then applying thermodynamic criteria the state possessing the lowest free enthalpy G is the most likely one. The elastic part of the free enthalpy of a deformed crystal is given quite generally by the expression $$-\frac{1}{2} \sum_{\lambda=1}^{6} \sum_{\mu=1}^{6} s_{\lambda\mu} \cdot T_\lambda \cdot T_\mu,$$

in which $s_{\lambda\mu}$ denotes the coefficients of elasticity and $T_\lambda$ the stress components. Applied to the present problem and assuming that the electrical field strength is nil and the temperature remains unchanged, the difference between the two Dauphine twin forms emerges as $$\Delta G = G_* - G = \frac{1}{2} \sum_{\lambda=1}^{6} \sum_{\mu=1}^{6} (s_{\lambda\mu} - s^*_{\lambda\mu}) \cdot T_\lambda \cdot T_\mu. \quad (1)$$

Assuming that only a simple monoaxial stress state $T_2$ exists, which is true of most piezoelectric transducers, this relation may be expressed in the form:

$$\Delta G = \frac{1}{2} \cdot (s'_{22} - s^*_{22}) \cdot T_2^2 \quad (2)$$

The difference between the compliances of the original form and of the twin form is easily calculated in the familiar manner from the transformation equations for rotated coordinate axes, producing the equation:

$$s'_{22} - s^*_{22} = -4 \cdot \cos[3\beta] \cdot \sin\alpha \cdot \cos^3\alpha \cdot s_{14} \quad (3)$$

Substituting (3) in (2) gives:

$$\Delta G = 2 \cos[3\beta] \sin\alpha \cos^3\alpha \cdot s_{14} \cdot T_2^2. \quad (4)$$

The requirement of maximum stability against twinning calls for the greatest possible value for $\Delta G$. Because the elastic coefficient $s_{14}$ for quartz in the untwinned state is negative, this requirement implies that the value of the angular function $\cos[3\beta] \sin\alpha \cos^3\alpha$ must be as high as possible. This is satisfied for $\alpha = 30°$ and 210° with $\beta = 0°$, 120° and 240°, and for $\alpha = 150°$ and 330° with $\beta = 60°$, 180° and 300°.

The higher stability against twinning has been unmistakably demonstrated experimentally in piezoelectric transducers with semi-cylindrical transverse quartzes with the orientation calculated as the optimum, which in accordance with the IRE recommendation is designated with the symbol XY t 30°. The same investigations and theoretical considerstions have revealed also that transverse quartzes oriented in this way show a much lower temperature coefficient for the transverse piezoelectric effect over a wide temperature range than the transverse quartzes employed normally hitherto.

As a further advantage of this cutting direction, the dependence on direction (anisotropy) of the coefficient of thermal expansion of the quartz in the plane of the electrodes is smaller. The fact that all these advantages are secured with similar orientations of the quartz elements is due to the material properties of quartz. Otherwise, there is no inner relation between these properties. The equivalence of the lattice planes (0 4 $\bar{4}$ 3), ($\bar{4}$ 0 4 3), (4 $\bar{4}$ 0 3) and ($\bar{1}$ 3 $\bar{2}$ 2); ($\bar{2}$ $\bar{1}$ 3 2), (3 $\bar{2}$ $\bar{1}$ 2) is given by the threefold symmetry of the Z axis of the quartz.

It should be pointed out that other crystal orientations resisting to twinning can be found by the instructions given before. For calculating $\Delta G$ which is decisive for the stability, formula (1) is applicable. It must also be emphasized that the invention is not restricted to quartz crystals, but may be applied analogously with other varieties of crystals which are piezoelectric and prone to twinning.

We claim:

1. A piezoelectric transducer for use in force, pressure and acceleration measuring systems comprising:
at least one transducer element which is prone to twinning;
means for introducing a force to said element; and
means for applying a prestress to said element in at least one direction forming an angle of less than 27° with a direction providing a maximum difference between respective elasticity coefficients of said element for stable and unstable twin forms of said element such that the stable form obtains a thermodynamic preference according to the relationship $$\Delta G = G_* - G = \frac{1}{2} \cdot \sum_{\lambda=1}^{6} \sum_{\mu=1}^{6} (s_{\lambda\mu} - s^*_{\lambda\mu}) \cdot T_\lambda \cdot T_\mu$$

wherein $G$ represents the elastic free enthalpy, $s$ represents the elastic compliance coefficients of said transducer element, and $T$ represents stress components.

2. A piezoelectric transducer according to claim 1, wherein said prestress is applied in a direction forming said angle of less than 27° with respect to the normal to the crystallographic lattice plane (0 4 $\bar{4}$ 3) of said element.

3. A piezoelectric transducer element according to claim 1, wherein said at least one transducer element is a disc-shaped longitudinal quartz element and includes electrodes mounted on respective surfaces thereof, said surfaces forming an angle of from about 0° to 27° with the crystallographic lattice plane (0 4 $\bar{4}$ 3) of said element.

4. A piezoelectric transducer according to claim 3, wherein the surfaces on which said electrodes are mounted form an angle of less than 27° with the crystallographic lattice plane ($\bar{1}$ 3 $\bar{2}$ 2) of said element.

5. A piezoelectric transducer according to claim 4, wherein said longitudinal quartz element has an orientation of approximately Y Z $l$ 20° $w$ 30°.

6. A piezoelectric transducer according to claim 1, wherein said at least one transducer element is a rod-shaped transverse quartz element, said rod-shaped element having a longitudinal axis at an angle of from about 0° to about 27° with respect to the normal to the crystallographic lattice plane (0 4 $\bar{4}$ 3) of said element.

7. A piezoelectric transducer according to claim 6, wherein said at least one rod-shaped transducer element has a segmented cross section.

8. A piezoelectric transducer according to claim 6, wherein said rod-shaped transducer element has the form of a hollow half-cylinder.

9. A piezoelectric transducer according to claim 6, wherein the longitudinal axis of said rod-shaped quartz element forms a right angle to said crystallographic lattice plane (0 4 $\bar{4}$ 3).

10. A piezoelectric transducer according to claim 6, wherein said transverse quartz element has an orientation of approximately X Y $t$ 30°.

11. A piezoelectric transducer according to claim 1, wherein said means for applying said prestress forms a preload on said transducer element in said at least one direction, said preload preventing formation of said twinned form in said transducer element.

12. A piezoelectric transducer according to claim 1, wherein said means for introducing a force to said element includes means for applying a prestress to said element.

13. A piezoelectric transducer according to claim 12, wherein said means for introducing a force include means for applying pressure.

* * * * *